March 10, 1925.
M. W. KELLOGG
1,528,832
APPARATUS FOR MAKING SEAMLESS TUBES
Filed Oct. 5, 1922    2 Sheets-Sheet 1
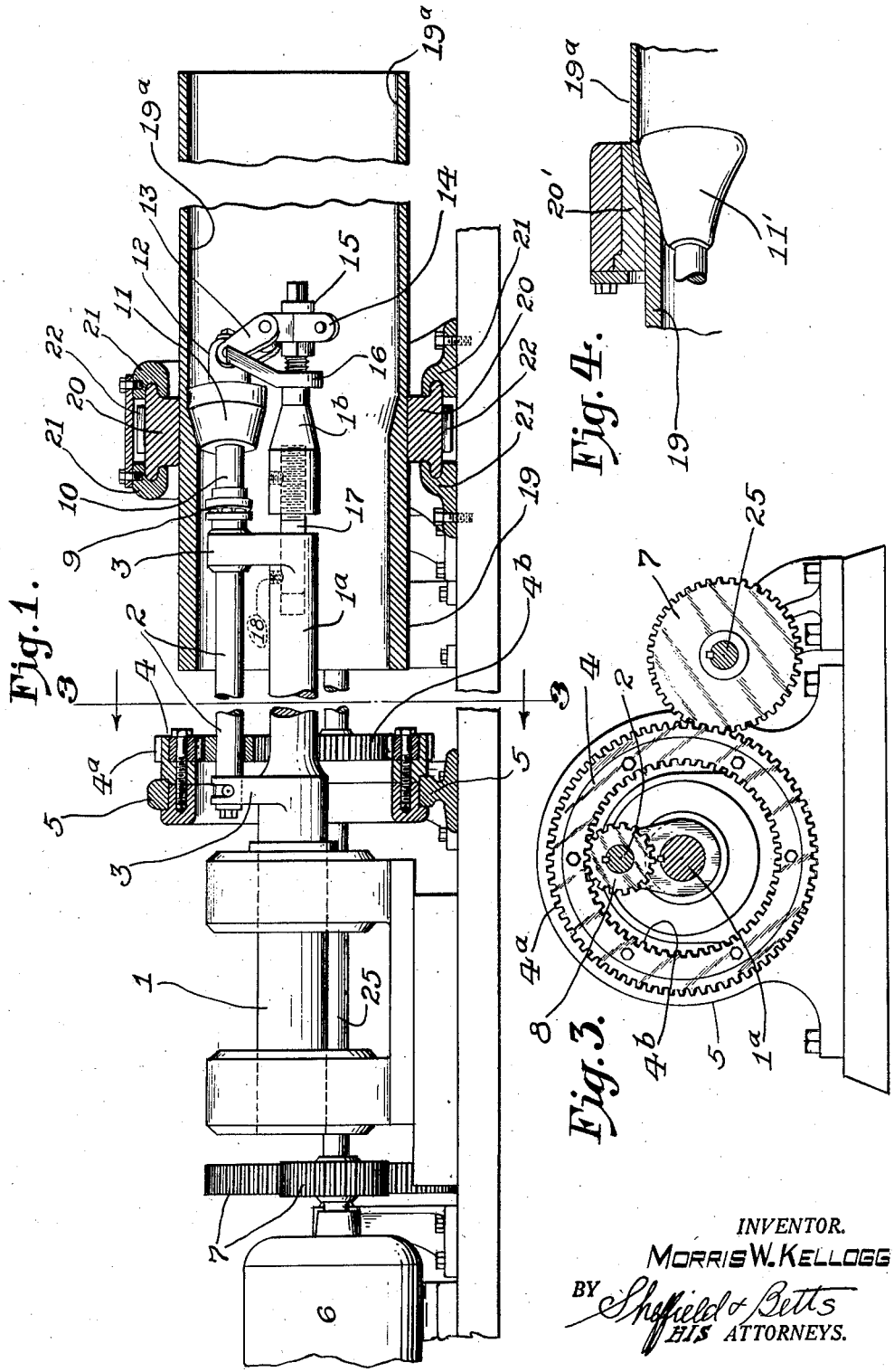
INVENTOR.
MORRIS W. KELLOGG
BY Sheffield & Betts
HIS ATTORNEYS.

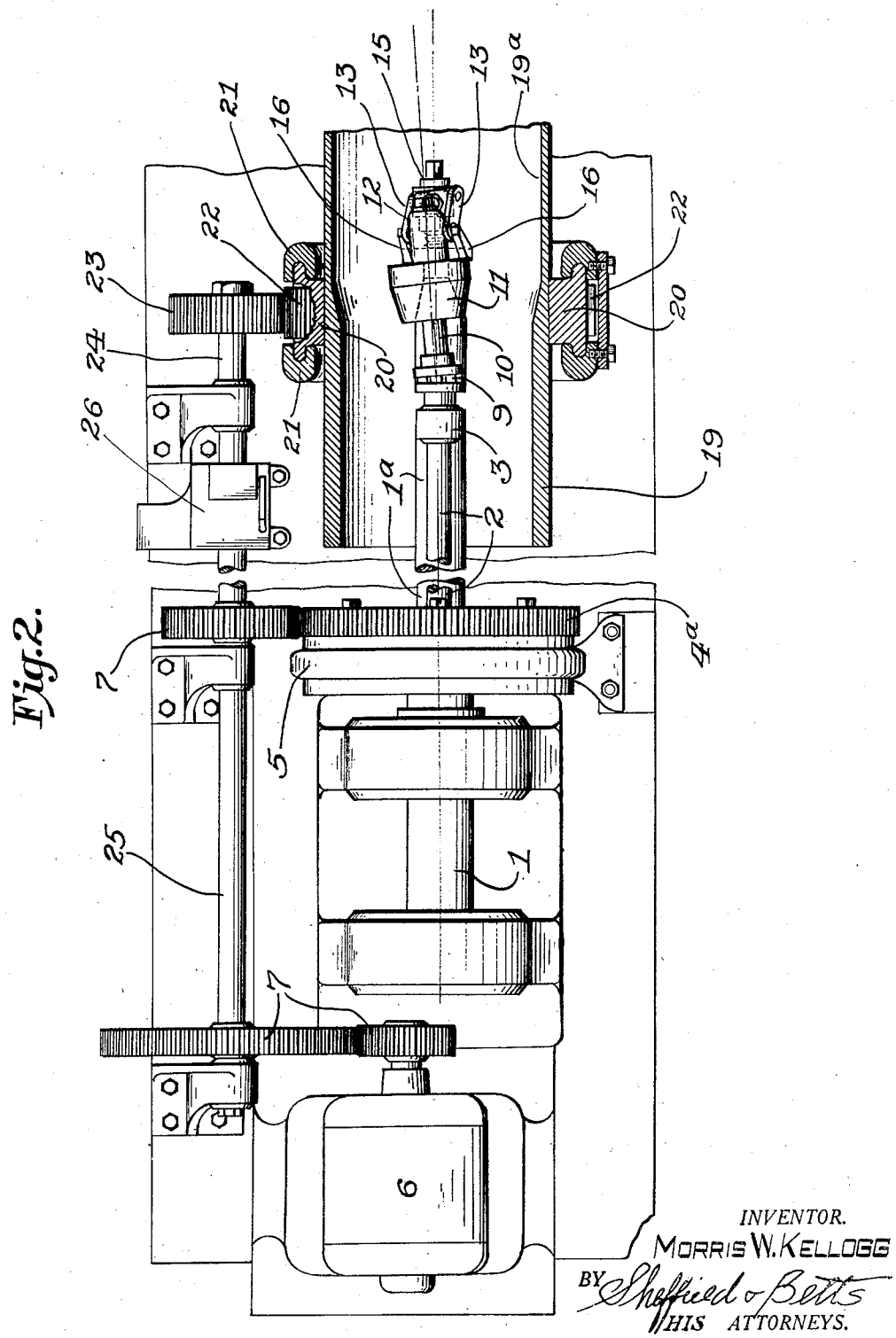

Patented Mar. 10, 1925.

1,528,832

UNITED STATES PATENT OFFICE.

MORRIS W. KELLOGG, OF NEW YORK, N. Y., ASSIGNOR TO THE M. W. KELLOGG COMPANY, A CORPORATION OF DELAWARE.

APPARATUS FOR MAKING SEAMLESS TUBES.

Application filed October 5, 1922. Serial No. 592,569.

*To all whom it may concern:*

Be it known that I, MORRIS W. KELLOGG, a resident of the city, county, and State of New York, and citizen of the United States of America, have invented certain new and useful Improvements in Apparatus for Making Seamless Tubes, of which the following is a specification.

My invention relates to apparatus for making seamless tubes, and is particularly adapted to the manufacture of tubes of large diameter. The primary object of my invention is to make possible and profitable the commercial production of such tubes. Other objects and advantages of my invention will be apparent to those skilled in the art from a reading of the following specification, taking in connection with the accompanying drawings in which—

Figure 1 is an elevation, partly shown in section, of my preferred form of apparatus;

Fig. 2 is a plan view thereof, partly shown in section;

Fig. 3 is a transverse section on the line 3—3 of Fig. 1, looking in the direction of the arrows; and Fig. 4 is a detail view of a modified form of die and roller.

Similar numerals refer to similar parts in all the views.

In the form of apparatus shown in the drawings, 1 is a heavy bracket or support, having the telescoping sections $1^a$ and $1^b$. The section $1^a$ carries a shaft 2 in bearings 3, 3. An annular gear 4, having external teeth $4^a$ and internal teeth $4^b$, is carried in the bearing 5 and rotated by the motor 6 through the gearing 7 which cooperates with the external teeth $4^a$. The shaft 2 is rotated by the internal gear $4^b$ through gear 8; this shaft is connected, through a flexible coupling 9, to a roller shaft 10, carrying a roller, 11, adapted to operate in the manner hereinafter described. Preferably, but not necessarily, the axis of the roller is set oblique, i. e., makes a small angle with the vertical plane passing through the longitudinal center of the bracket 1, as is clearly shown in Fig. 2; in some cases, it may be advantageous to incline the axis of the roller to the horizontal, such inclination being either in addition to or in substitution for the oblique displacement. It should be understood, however, that my invention covers either having the roller-axis parallel with the longitudinal center of the support or making a small angle with it, either vertically or horizontally or both.

The outer end of the roller-shaft 10 may be adjustably supported by an extension of the bracket 1 in the following manner: The end of the shaft 10 runs in a bearing 12 to which are pivotally attached links 13 which are also pivotally attached to the clamp 14 on the extension 15 of the bracket 1; such extension 15 may be screwed into or out of the end of the portion $1^b$ of the bracket, thus raising or lowering the bearing 12 on the roller-shaft. The telescoping portion $1^b$ of the bracket rigidly caries a yoke or guide 16 which holds the bearing 12 against lateral motion; the portion $1^b$ and the yoke 16 may be turned about the longitudinal center of the bracket 1 by means of the stud 17 and set-screw 18, thus giving lateral adjustability to the bearing 12.

A cylindrical tube blank 19, of substantially thick wall, is so arranged that the roller 11 operates upon its interior surface, simultaneously reducing the thickness of the wall of the blank 19, as shown at $19^a$, and proportionately elongating the blank. In contact with the outer surface of the tube blank, adjacent the roller 11, is a bearing member having the form of a ring or die 20, surrounding the blank; the die is carried in annular bearings 21 and, as shown here, is provided with gear teeth 22 adapted to be driven by the spur gear 23 journaled on the shaft 24 which is in turn connected, through a clutch and transmission gearing 26, to the shaft 25 and the motor 6.

The apparatus shown and described herein is susceptible of many alterations and modifications without departure from the scope of my invention; I therefore desire protection for all such alterations and modifications as come within the scope of the appended claims. For example, without intending to suggest or explain more than a few possible alterations and without intending any limitations upon my invention, the following changes are apparent: The means for adjusting the plane of rotation of the roller 11 may be varied in many ways or such plane may be fixed and determined in any particular machine; two or more rollers may be used; their shape may be varied in many ways and their surfaces made corrugated or simply curved; the bearing member operating on the exterior of the blank may be either free to rotate (as shown), may be given other motion, or may be fixed; the bearing face of this member may take numerous forms, provided only that the form used shall properly cooperate with the form of roller used; it is not essential that the bearing member have the form of a ring so long as it is designed to function properly; the tube blank may be positively rotated or fed or both in addition to any motion given to it by the action of the roller or bearing member; etc.

In Fig. 4, I have shown one possible modification of my apparatus in which the diameter of the tube blank is increased simultaneously with the reduction and elongation of its wall; it will also be understood that, in a similar manner, the diameter of the tube blank may be decreased. Also, the diameter may be changed without altering the thickness of the wall, if desired.

The operation of my apparatus will be obvious to those skilled in the art. At the commencement of the operation, the blank properly heated to working temperature, is so placed that its right-hand end will be gripped between the roller 11 and bearing member 20; the motor is then started. If the roller is set oblique as shown in Fig. 2, its rotation, as is well known, will simultaneously rotate and advance the blank as well as reduce and elongate its wall,—i. e., will perform the operation known as oblique rolling. In this manner, the entire blank will be transformed into the finished seamless tube of the desired and predetermined size and thickness of wall. If the roller 11 is not horizontally displaced, as shown, independent means for forcing the blank longitudinally through the reducing means must be supplied.

The purpose of imparting motion to the exterior bearing member is to reduce the power necessary to reduction of the blank, as is more fully described in an application for Letters Patent of the United States, Serial No. 494,394, filed by Emil J. Holinger and myself on August 22, 1921. Such motion may be derived, as shown, from the same source of power as that used to rotate the roller 11. The clutch and transmission gearing, 26, are supplied in order that the die 20 may be kept stationary or may be revolved in either direction and at any desired speed.

Having described my invention, what I claim is:

1. Apparatus for making a seamless tube by the oblique rolling method comprising in combination a bearing member for operating upon the exterior surface of the wall of a cylindrical blank from which the tube is to be formed, a roll inside of the blank adapted to reduce the wall thereof between said roll and said bearing member and means for positively rotating said roll about a stationary axis which is oblique to that of the blank.

2. Apparatus for making a seamless tube by the oblique rolling method comprising in combination a bearing member for operating upon one surface of the wall of a cylindrical blank from which the tube is to be formed, a roll adapted to reduce the wall of said blank between said roll and said bearing member, means for positively rotating said roll about a stationary axis which is oblique to that of the blank, and means for imparting motion to said bearing member.

3. Apparatus for making a seamless tube by the oblique rolling method comprising in combination a bearing member for operating upon the exterior surface of the wall of a cylindrical blank from which the tube is to be formed, a roll inside of the blank adapted to reduce the wall thereof between said roll and said bearing member means for positively rotating said inner roll about a stationary axis which is oblique to that of the blank, and means for imparting motion to said bearing member.

4. Apparatus for making a seamless tube comprising in combination a bearing member for operating upon the exterior surface of the wall of a cylindrical blank from which the tube is to be formed, a roll inside of the blank adapted to reduce the wall thereof between said roll and said bearing member and means for positively rotating said roll about a stationary axis making a small angle with a line parallel to the axis of the blank.

5. Apparatus for making a seamless tube comprising in combination a bearing member for operating upon the exterior surface of the wall of a cylindrical blank from which the tube is to be formed, a roll inside of the blank adapted to reduce the wall thereof between said roll and said bearing member means for positively rotating said roll about a stationary axis, and means for imparting motion to said bearing member.

6. Apparatus for making a seamless tube comprising in combination an annular die for operating upon a cylindrical blank from which the tube is to be formed, the said blank being so arranged as to contact with the interior surface of said die, a roll inside of the blank adapted to reduce the wall thereof between said roll and said die, means for positively rotating said roll about a stationary axis, and means for imparting motion to said die.

7. Apparatus for making a seamless tube comprising in combination an annular die for operating upon a cylindrical blank from which the tube is to be formed, the said blank being so arranged as to contact with the adjacent surface of said die, a roll inside of the blank adapted to reduce the wall thereof between said roll and said die, means for positively rotating said roll about a stationary axis, and means for rotating said die in a plane perpendicular to the axis of the blank.

8. Apparatus for making a seamless tube comprising in combination an annular die for operating upon a cylindrical blank from which the tube is to be formed, the said blank being so arranged as to contact with the interior surface of said die, a roll inside of the blank adapted to reduce the wall thereof between said roll and said die, and means for positively rotating said roll about a stationary axis making a small angle with a line parallel to the axis of the blank.

9. Apparatus for making a seamless tube comprising in combination a bearing member for operating upon the exterior surface of the wall of a cylindrical blank from which the tube is to be formed, a roll inside of the blank adapted to reduce the wall thereof between said roll and said bearing member, means for positively rotating said roll about a stationary axis making a small angle with a line parallel to the axis of the blank, and means for imparting motion to said bearing member.

10. Apparatus for making a seamless tube comprising in combination a bearing member for operating upon the exterior surface of the wall of a cylindrical blank from which the tube is to be formed, a roll inside of the blank adapted to reduce the wall thereof between said roll and said bearing member, means for positively rotating said roll about a stationary axis making a small angle with a line parallel to the axis of the blank—the axes of the roll and of the blank being non-intersecting—, to cause said blank to revolve.

11. Apparatus for making a seamless tube comprising in combination a bearing member for operating upon the exterior surface of the wall of a cylindrical blank from which the tube is to be formed, and a roll inside of the blank, rotating about a stationary axis and adapted to operate upon the wall of said blank adjacent said bearing member, said bearing member and said roll being so designed as to increase both the interior and exterior diameters of said blank.

12. Apparatus for making a seamless tube by the oblique rolling method comprising in combination a bearing member for operating upon one surface of the wall of a cylindrical blank from which the tube is to be formed, and a roll having a stationary axis which is oblique to that of the blank, said roll being adapted to operate upon the opposite side of said wall adjacent said bearing member, said bearing member and said roll being so designed as to alter both the interior and exterior diameters of said blank in the same radial direction.

MORRIS W. KELLOGG.